No. 768,278. PATENTED AUG. 23, 1904.
G. H. HASTINGS.
PNEUMATIC TIRE.
APPLICATION FILED NOV. 8, 1902.
NO MODEL.

Witnesses.
Helen Hechsler.
Marvin J. Seiber.

Inventor:
George H. Hastings,
By H. H. de Vos
ATTORNEY.

No. 768,278.                                                                 Patented August 23, 1904.

UNITED STATES PATENT OFFICE.

GEORGE HENRY HASTINGS, OF OPORTO, PORTUGAL.

PNEUMATIC TIRE.

SPECIFICATION forming part of Letters Patent No. 768,278, dated August 23, 1904.

Application filed November 8, 1902. Serial No. 130,620. (No model.)

*To all whom it may concern:*

Be it known that I, GEORGE HENRY HASTINGS, a subject of the British King, residing at Oporto, Portugal, in the Kingdom of Portugal, have invented certain new and useful Improvements in Pneumatic Tires for the Wheels of Cycles and other Vehicles, of which the following is a specification.

This invention relates to an improvement in detachable pneumatic tires in which the outer cover of the tire is held on the rim of the wheel by the inflation of an inner tube, such outer cover being formed with suitable edges or flanges to prevent the cover from blowing off the rim of the wheel when the tire is inflated.

According to my invention I fit to the edges of the outer cover of the tire endless gut bands of any suitable thickness or shape in cross-section. Such endless gut bands may be covered with a thin tissue of gutta-perch, india-rubber, or the like, whereby the gut bands are rendered waterproof. Such covered endless gut bands are fitted to the edges of the outer cover of the tire and inclosed in the canvas or fabric, extending from the under surface of the outer cover, or said endless gut bands may be fitted to the sides of a single-tube tire or any other form of tire in any suitable manner.

Figure 1:
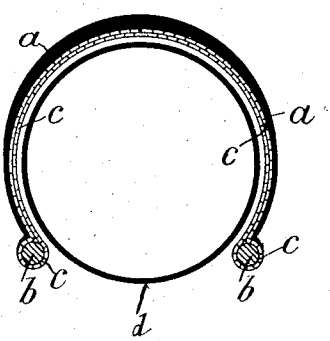
Figure 2:
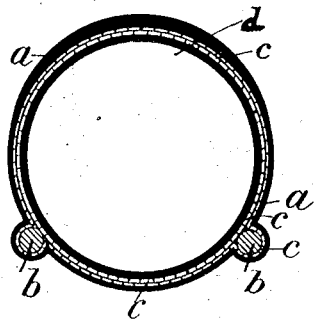

In the drawings, Figure 1 is a transverse sectional view of the tire with my improvement thereon. Fig. 2 is of similar view showing another method of employing my improvement in connection with tires.

Referring more particularly to the drawings, the inner tire *d* has arranged upon the outer surface thereof the canvas inner cover *c* of the outer tire *a*, and within this canvas cover *c* are arranged near the edges of tire *a* the continuous gut bands *b*.

In Fig. 1 the bands are arranged within the cover *c* adjacent the ends or edges of tire *a*, this tire not extending entirely around the rim, while in Fig. 2 the bands *b* are entirely inclosed within this outer tire. These gut bands are made jointless by taking a number of strips of gut and moistening them in any suitable liquid to soften them. These softened strips are then wound around drums, the end of each succeeding strip being connected with the previous strip at as great a distance from the end thereof as practicable. When a sufficient number have been wound on the drum to form a jointless band of the required thickness, they are removed, twisted together, and then compressed to a solid band, which is then dried. The gut bands are made endless, without any join, and at first somewhat smaller than the actual size of the rim of the wheel and are then subjected to a great strain on an extensible drum or by any other suitable means and stretched to the actual size required, whereby the elasticity is taken out of them and they will not stretch any more however hard the tire be inflated. The waterproof covering of said endless gut bands prevents the gut being affected during wet or damp weather. A detachable pneumatic tire fitted with such specially-prepared endless waterproof gut bands possesses the important advantage over detachable tires fitted with endless wires on their edges in that the gut being extremely flexible is very easy to disconnect from the rim of the wheel when it is desired to remove the outer cover, and such gut bands being made endless, without a join, there is no join to give away.

I have found that gut bands made in the special manner hereinbefore described and of a sufficient thickness will not stretch under any pressure of inflation which pneumatic tires are subjected to, and said endless gut bands possess the important advantage over tires made with hard-rubber or combined rubber and canvas edges in that it produces a much lighter tire and a tire that is not liable to blow off the rim when under high pressure of inflation, it being a well-known fact that hard-rubber or combined rubber and canvas or other fabric edges of detachable pneumatic tires often stretch and blow off the rim of the wheel when the tire is highly inflated unless such rubber or rubber and fabric edges be made excessively thick and heavy, so as to prevent their stretching, which, it will be understood, makes the tire very heavy. By the use of such specially-prepared endless waterproof gut bands I attain the before-mentioned important advantages over existing detachable pneumatic tires fitted with endless wires on their edges and those formed with hard-rubber or combined rubber and fabric edges.

The following is what I claim as my invention and desire to secure by Letters Patent:

1. In a device of the type set forth, the combination with the inner covering of a pneumatic tire, of continuous, flexible securing-bands of gut, said bands comprising a plurality of strands having their joints broken and their ends secured together in overlapping positions whereby a continuous securing means is formed, substantially as described.

2. In combination with a pneumatic tire, a continuous, non-elastic band in engagement with the inner cover of the outer tire, comprising a plurality of single strands of gut laid one upon the other, the ends of each strand overlapping the ends of another, and the said strands being twisted and compressed to form endless, substantially integral securing means, substantially as set forth.

In testimony whereof I affix my signature in the presence of two witnesses.

GEORGE HENRY HASTINGS.

Witnesses:
    W. H. STUVE,
    HUTIN F. OHRIS.